United States Patent
Son

(10) Patent No.: US 11,982,374 B1
(45) Date of Patent: May 14, 2024

(54) ANGLE VALVE WITH LOCKING CHECK FUNCTION

(71) Applicant: SRT CO., LTD, Hwaseong-si (KR)

(72) Inventor: Yeongman Son, Hwaseong-si (KR)

(73) Assignee: SRT CO., LTD., Hwaseong-si (KR)

( * ) Notice: Subject to any disclaimer, the term of this patent is extended or adjusted under 35 U.S.C. 154(b) by 0 days.

(21) Appl. No.: 18/378,923

(22) Filed: Oct. 11, 2023

(30) Foreign Application Priority Data

Dec. 2, 2022 (KR) .................. 10-2022-0166468

(51) Int. Cl.
| | |
|---|---|
| *F16K 37/00* | (2006.01) |
| *F16K 1/02* | (2006.01) |
| *F16K 31/60* | (2006.01) |
| *F16K 35/02* | (2006.01) |

(52) U.S. Cl.
CPC ........ *F16K 37/0058* (2013.01); *F16K 31/607* (2013.01); *F16K 35/025* (2013.01); *F16K 1/02* (2013.01)

(58) Field of Classification Search
CPC ...... F16K 31/50; F16K 31/502; F16K 31/504; F16K 31/60; F16K 31/607; F16K 35/025; F16K 35/06; F16K 35/10; F16K 37/0008; F16K 37/0058; F16K 37/0075; F16K 37/0083
USPC ...................................................... 251/284
See application file for complete search history.

(56) References Cited

U.S. PATENT DOCUMENTS

| | | | | |
|---|---|---|---|---|
| 1,139,208 | A | * 5/1915 | McMurray | F16K 35/025 251/105 |
| 1,266,937 | A | * 5/1918 | Haselwander | F16K 35/025 251/105 |
| 1,343,530 | A | * 6/1920 | Tallman | F16K 35/025 251/106 |
| 2005/0199292 | A1 | * 9/2005 | Stedman | F16K 35/025 137/553 |

FOREIGN PATENT DOCUMENTS

KR   10-2013-0087340 A   8/2013

OTHER PUBLICATIONS

Office action issued Apr. 2, 2023 in counterpart Korean Application No. 10-2022-0166468. (4 Pages Korean).
Notice of allowance issued Jul. 26, 2023 in counterpart Korean Application No. 10-2022-0166468 (3 Pages Korean).

* cited by examiner

*Primary Examiner* — Kevin F Murphy
*Assistant Examiner* — Jonathan J Waddy
(74) *Attorney, Agent, or Firm* — NSIP Law

(57) ABSTRACT

The present disclosure provides convenience of use by automatically displaying a display of "OPEN" or "CLOSE" displaying an open or closed state of a valve according to the manipulation of a handle portion.

4 Claims, 13 Drawing Sheets

(a)

(b)

(a)

(b)

US 11,982,374 B1

ANGLE VALVE WITH LOCKING CHECK FUNCTION

CROSS-REFERENCE TO RELATED APPLICATION

This application claims the benefit under 35 U.S.C. 119(a) of Korean Patent Application No. 10-2022-0166468 filed on Dec. 2, 2022 in the Korean Intellectual Property Office, the entire disclosure of which is incorporated herein by reference for all purposes.

TECHNICAL FIELD

The present disclosure relates to an angle valve with a locking check function, including: a main body portion 100 in which an internal movement path 110, an inlet 120, and an outlet 130 are formed; an opening and closing blade 200 provided on the internal movement path 110 to open and close the outlet 130; a shaft portion 300 coupled to an upper portion of the opening and closing blade 200 and having a thread formed on an outer side surface; a lifting guide block 400 formed on an upper center side of the main body portion 100 and screwed to the shaft portion 300; an upper flange portion 500 that is coupled to an upper portion of the main body portion 100, has a first seating space 510 formed on an inner side, and has a first through hole 520 through which the shaft portion 300 passes is formed with a perforation in a lower portion of the first seating space 510; a handle portion 600 coupled by surrounding the upper flange portion 500 and coupled to the shaft portion 300 to move the shaft portion 300 in up and down directions according to a rotation direction and to ascend or descend the opening and closing blade 200; and an opening and closing display guide portion 700 that is coupled to an upper side of the handle portion 600 and rotates counterclockwise of the handle portion 600, and ascends when the opening and closing blade 200 closes the outlet 130 to display "CLOSE."

BACKGROUND

Generally, valves used in semiconductor processes are installed in pipes between vacuum pumps and vacuum equipment to control vacuum states.

These valves are used to configure a handle according to the shape and then allow a worker to open or close an inflow path by manipulating the handle.

Such angle valves are being developed through various embodiments, and among them, "Opening and closing device for valve (Korean Utility Model Registration Publication No. 20-0235304)" in Patent Document 1 below is published.

The "opening and closing device for valve" of Patent Document 1 includes: a stem coupled to one side of a valve to move up and down by rotation in order to keep a disc in close contact with or away from a valve seat; a lower rotating member connected to rotate with the stem and having a one-way tooth portion formed on an upper surface; an upper rotating member having a one-way tooth portion of the same shape as the one-way tooth portion of the upper rotating member on a bottom surface; an elastic member that elastically supports the lower rotating member upward between upper ends of the stem so that the lower rotating member is coupled to the upper rotating member; and a coupling unit for rotatably coupling the upper rotating member to an upper portion of the stem with the lower rotating member interposed therebetween. The one-way tooth portion is formed so that one side surface of each tooth has an obtuse angle and the opposite side surface has an acute angle of 90 degrees or less, so that the upper rotating member always rotates the lower rotating member, which is coupled by the elastic force of a spring, in one direction, and will spin freely when more than a certain force is applied in the other direction. When the disc presses the valve seat with the same force, a constant force is always applied, so not only is the fluid controlled accurately, but the valve seat is not damaged, thus enabling usage for a long time.

However, the "opening and closing device for valve" of Patent Document 1 does not have a separate configuration to limit rotation of the stem in the opposite direction in the locked state, so the locked state might be released arbitrarily.

RELATED ART DOCUMENT

Patent Document (Patent Document 1) Patent Document 1: Korean Utility Model Registration Publication No. 20-0235304

SUMMARY

The present disclosure has been devised to obviate the above limitation. An aspect of the present disclosure is directed to providing an angle valve with a locking check function that allows a worker to easily recognize a closed state of the valve as an open or closed state of the valve may be visually checked, is able to prevent errors in work, and ensures convenience of use by automatically displaying "OPEN" or "CLOSE" display according to the manipulation of a handle portion.

The angle valve with a locking check function according to an embodiment of the present disclosure includes: a main body portion 100 in which an internal movement path 110, an inlet 120, and an outlet 130 are formed; an opening and closing blade 200 provided on the internal movement path 110 to open and close the outlet 130; a shaft portion 300 coupled to an upper portion of the opening and closing blade 200 and having a thread formed on an outer side surface; a lifting guide block 400 formed on an upper center side of the main body portion 100 and screwed to the shaft portion 300; an upper flange portion 500 that is coupled to an upper portion of the main body portion 100, has a first seating space 510 formed on an inner side, and has a first through hole 520 through which the shaft portion 300 passes is formed with a perforation in a lower portion of the first seating space 510; a handle portion 600 coupled by surrounding the upper flange portion 500 and coupled to the shaft portion 300 to move the shaft portion 300 in up and down directions according to a rotation direction and to ascend or descend the opening and closing blade 200; and an opening and closing display guide portion 700 that is coupled to an upper side of the handle portion 600 and rotates counterclockwise of the handle portion 600, and ascends when the opening and closing blade 200 closes the outlet 130 to display "CLOSE."

In addition, the handle portion 600 includes: a locking pin fixture 610 that is seated in the first seating space 510, has a second seating space 611 formed on an inner side, has a second through hole 612 through which the shaft portion 300 passes formed with a perforation in a lower portion of the second seating space 611, and has a locking hole 613 formed with a perforation on an outer peripheral surface; a rotating body 620 that is seated in the second seating space 611 in which a coupling groove 621 coupled to the shaft portion 300 is recessed in a lower portion, a locking pin moving space 622 is recessed in an inner direction around an outer peripheral surface of a lower side, and a coupling protrusion 623 is formed in a vertical direction in the locking pin moving space 622; a locking pin 630 that is located within the locking pin moving space 622 and is formed in a "C"-shape in which a hinge hole 631 that is coupled to the coupling protrusion 623 through a hinge is formed with a perforation, and a locking protrusion 632 is formed to protrude and be caught by the locking hole 613 according to a rotation direction of the rotating body 620 on an outer side and limit a rotational movement of the rotating body 620; a first spring 640 formed by winding the coupling protrusion 623, one side of which is in contact with an inner surface of the second seating space 511, and the other side of which is coupled to the locking pin 630 and pushes the locking protrusion 632 outward through elastic force; and a gripping portion 650 with a split plate 651 formed inside to form a third seating space 652 where the opening and closing display guide portion 700 is seated in an upper portion thereof and form a fourth seating space 653 surrounding the locking pin fixture 610 and the upper flange portion 500 in a lower portion thereof.

In addition, a plurality of first lifting pin passing holes 654 are formed with a perforation in the split plate 651, and a second lifting pin passing hole 624 is formed with a perforation at a position corresponding to the first lifting pin passing hole 654 in the rotating body 620.

In addition, the outer side of the locking protrusion 632 is formed as a curved surface, and a ring-shaped latch portion 633 is formed at the tip. The tip of the locking hole 613 is formed in a stepped structure and the distal end is formed as a curved surface.

In addition, the opening and closing display guide portion 700 includes: a second spring 710 provided in the third seating space 652; a roller portion 720 formed on a center side of the third seating space 652; a lifting plate portion 730 seated on the second spring 710 and having a third lifting pin passing hole 731 formed with a perforation at a position corresponding to the second lifting pin passing hole 624 and a roller passing hole 732 through which the roller portion 720 passes formed with a perforation on a center side; a lifting pin 740 fixed in a state where the tip is inserted into the third lifting pin passing hole 731 and inserted through the second lifting pin passing hole 624 and the first lifting pin passing hole 654; a display portion 750 having an inclined portion 751 formed at an angle in a lower portion thereof and in contact with the roller portion 720 and having "OPEN" and "CLOSE" displays formed at an upper portion thereof; a cover portion 760 formed with a check window 761 on which a display of "OPEN" or "CLOSE" appears at an upper portion thereof; and a third spring 770 located between one side of the display portion 750 and an inner side surface of the cover portion 760 to provide elastic force to the display portion 750.

In addition, the lifting pin 740 includes: a main body 741; a tip pin portion 742 formed on an upper portion of the main body 741 to be smaller than a diameter of the main body 741 and inserted into the third lifting pin passing hole 731; a distal end pin portion 743 formed on a lower portion of the main body 741 to be larger than a diameter of the main body 741 and inserted into the second lifting pin passing hole 624; and a locking pin insertion groove 744 recessed in an inner side direction around a lower outer side surface of the distal end pin portion 743.

According to an embodiment of the present disclosure, an open or closed state of a valve can be visually checked, thus allowing a worker to easily recognize a closed state of the valve and preventing errors in work, and a display of OPEN or CLOSE is automatically displayed according to the manipulation of a handle portion, thus ensuring convenience of use.

DETAILED DESCRIPTION

Figure 1:
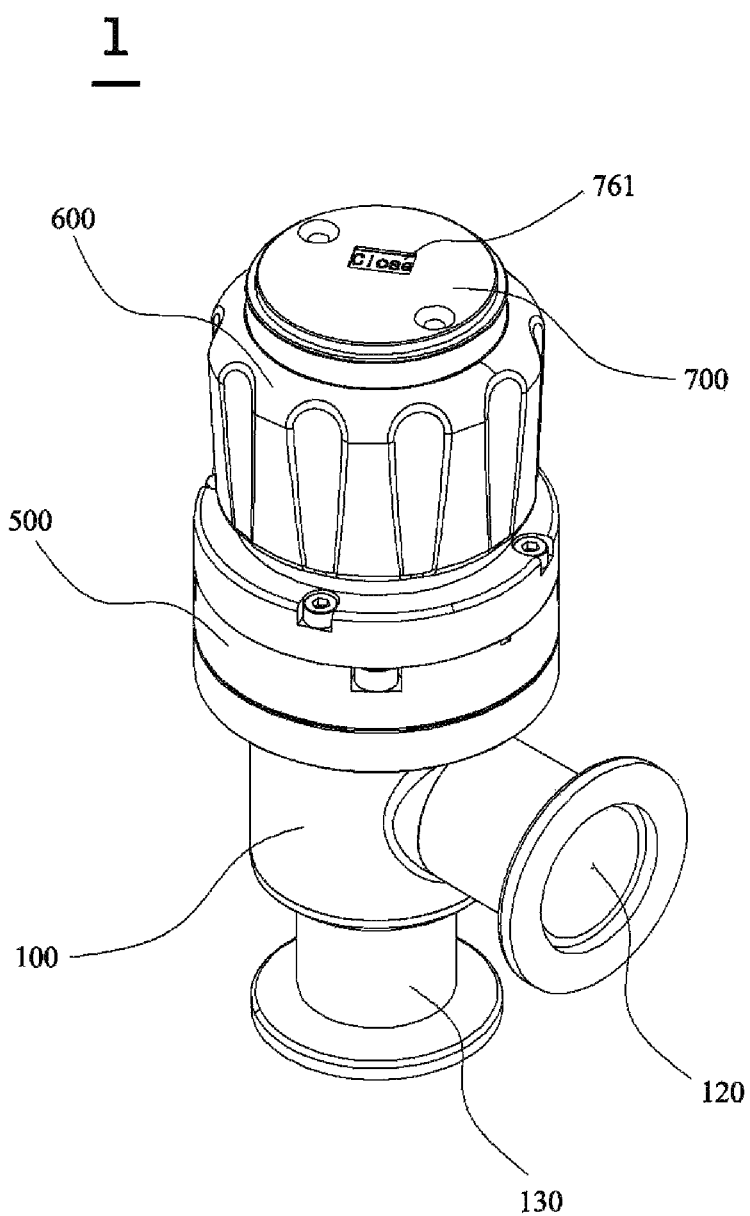
FIG. 1 is a perspective view of the overall appearance of an angle valve with a locking check function according to a preferred embodiment of the present disclosure.

Hereinafter, with reference to the attached drawings, an angle valve 1 with a locking check function according to an embodiment of the present disclosure will be described in detail. First of all, it should be noted that in the drawings, like reference numerals refer to like constituents or parts whenever possible. In describing an embodiment of the present disclosure, detailed descriptions of related known functions or configurations are omitted in order to not obscure the gist of the present disclosure.

Figure 2:
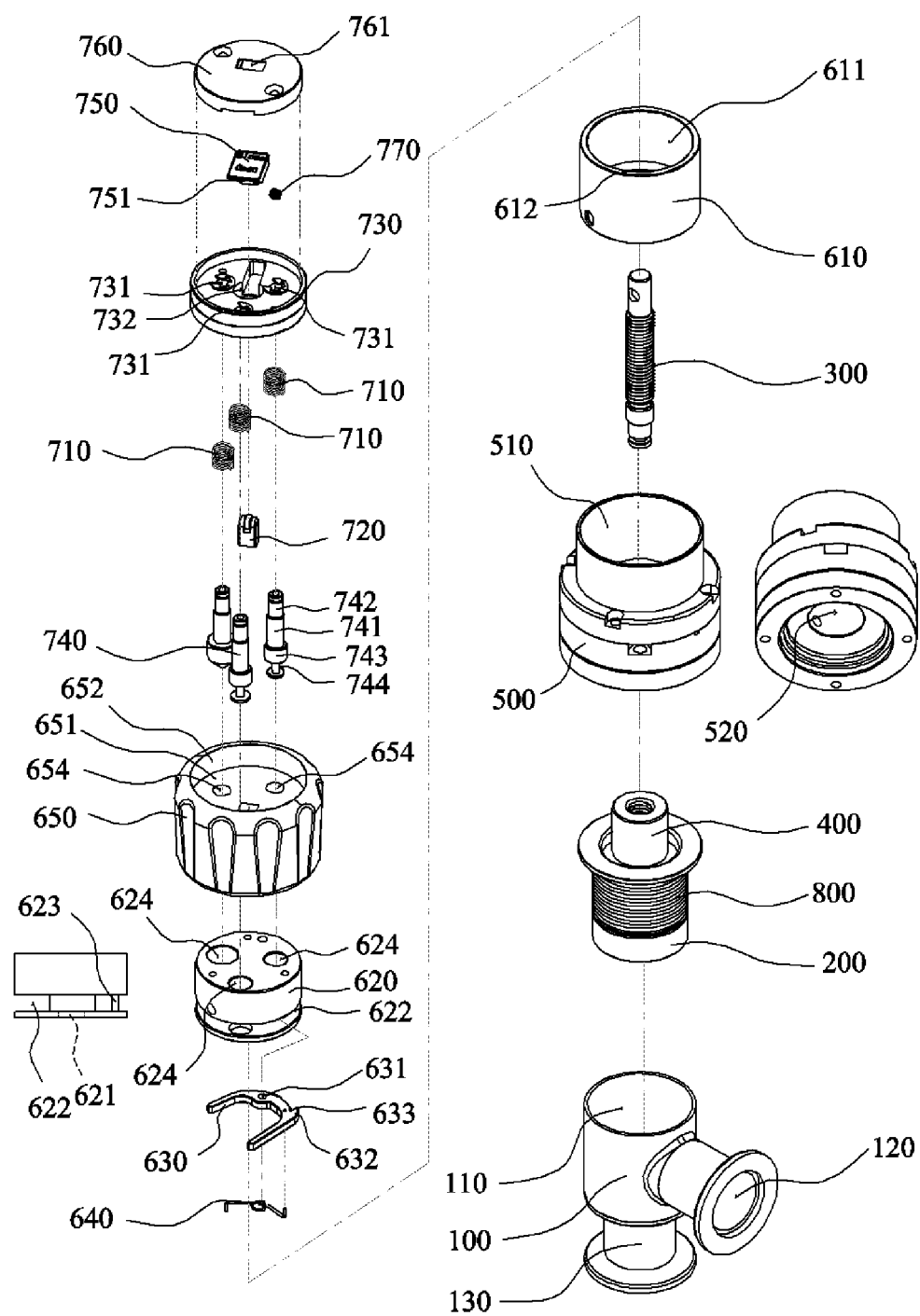
FIG. 2 is an exploded perspective view of an angle valve with a locking check function according to a preferred embodiment of the present disclosure.

Referring to FIG. 1 or 2, the angle valve 1 a locking check function according to an embodiment of the present disclosure is largely configured of a main body portion 100, an opening and closing blade 200, a shaft portion 300, a lifting guide block 400, an upper flange portion 500, a handle portion 600, and an opening and closing display guide portion 700.

Figure 9:
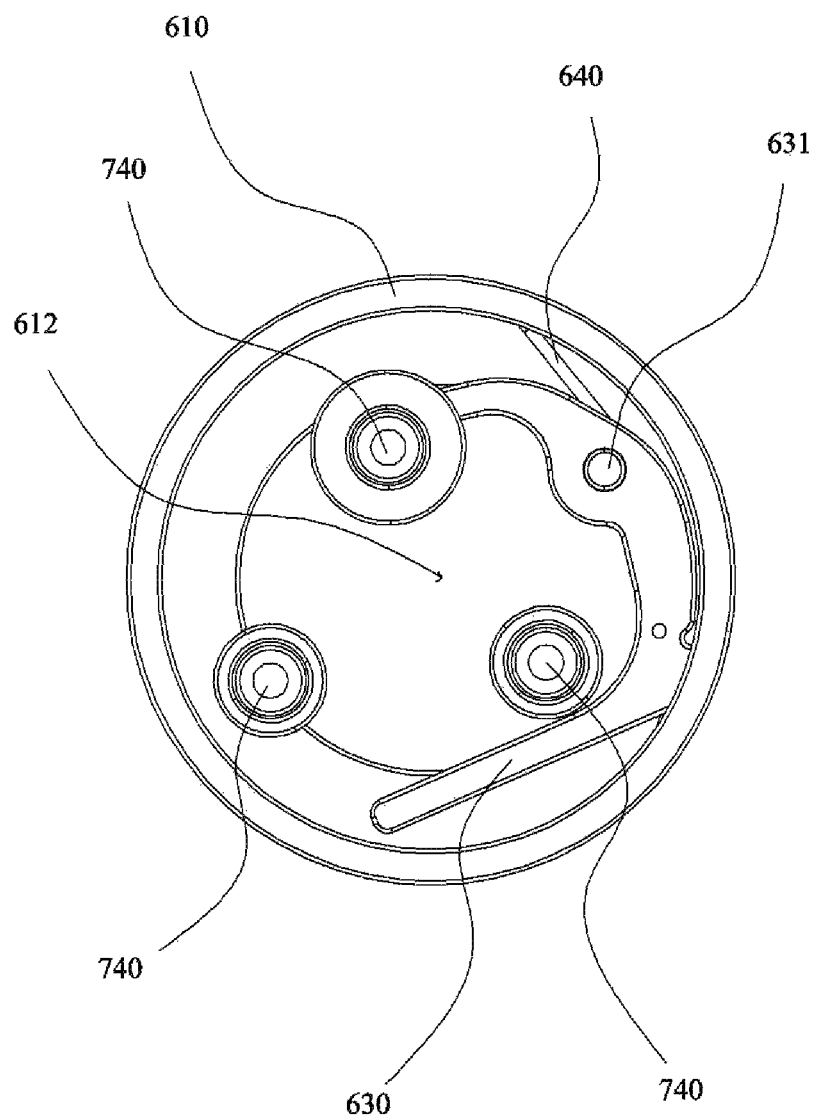
Figure 10:
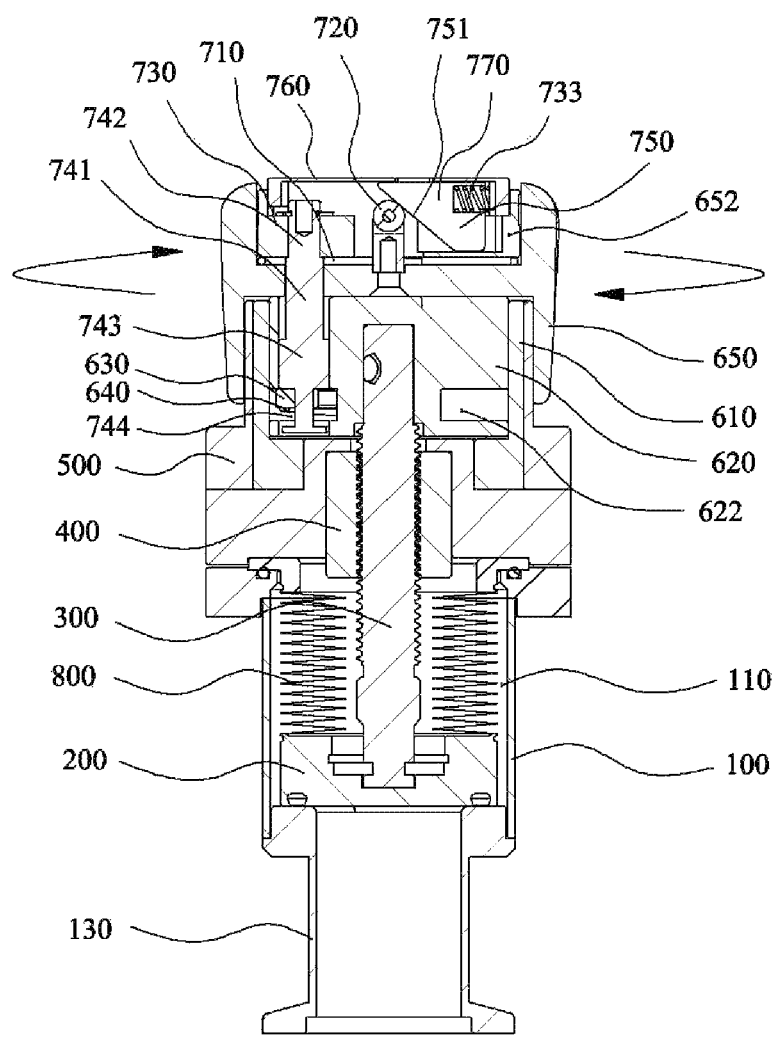
FIG. 10 is an embodiment diagram showing an angle valve with a locking check function according to a preferred embodiment of the present disclosure, showing the handle portion rotating clockwise while the cover portion is pressed.
Figure 11:
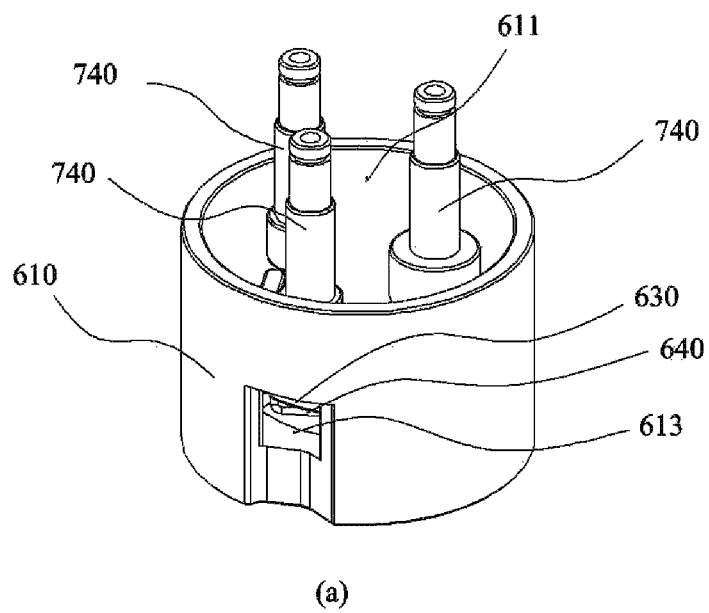
FIGS. 11 and 12 are embodiment diagrams showing each of the positions of the locking pin, locking protrusion, and lifting pin in the state of FIG. 10.
Figure 11:
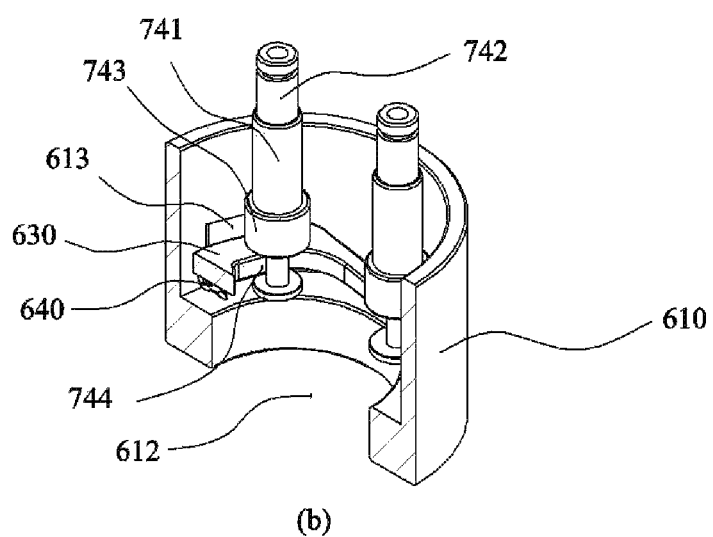
Figure 12:
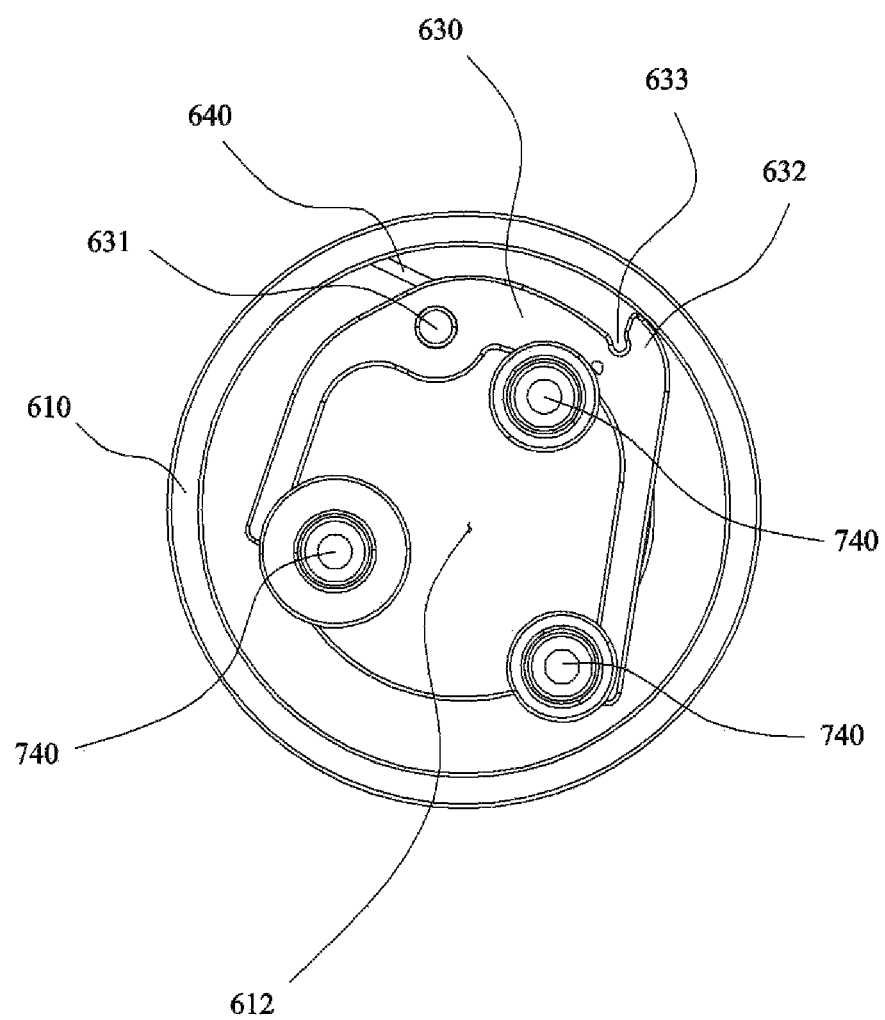
Figure 13:
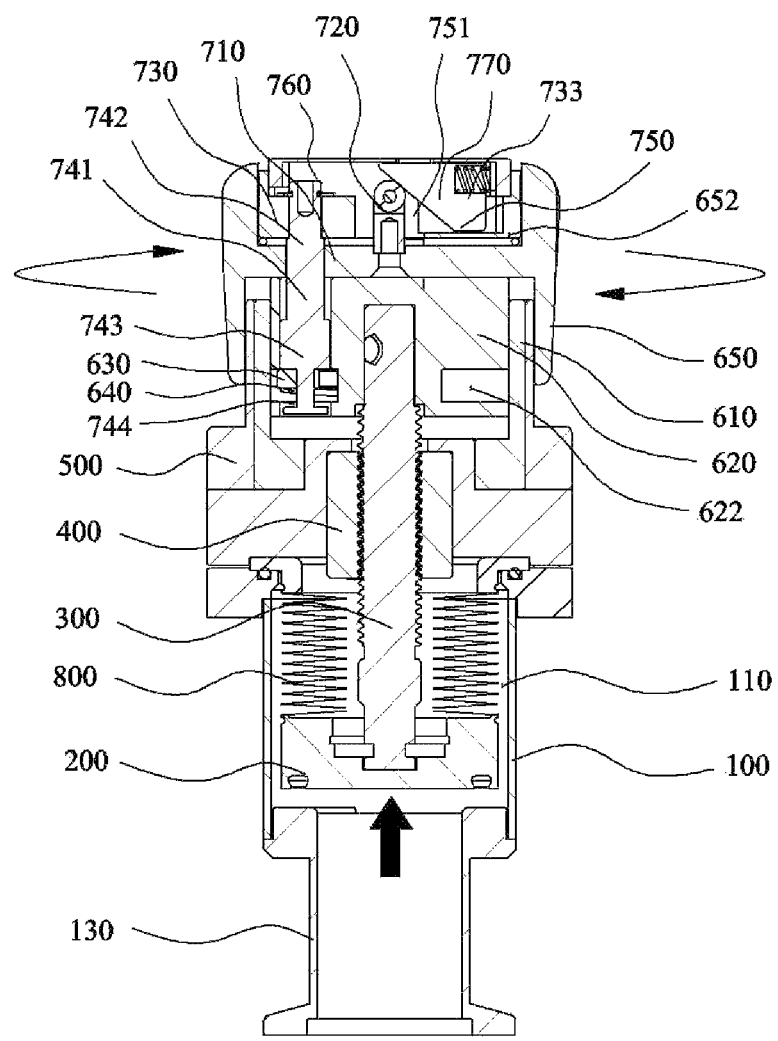
FIG. 13 is an embodiment diagram showing an outlet being opened by continuously rotating the handle portion of the angle valve with a locking check function in a clockwise direction according to a preferred embodiment of the present disclosure.

Before explanation, for a clear and detailed description of an embodiment of the present disclosure, it should be noted that the clockwise direction is set as an open state and the counterclockwise direction is set as a closed state, based on FIG. 9.

First, the main body portion 100 will be described. As shown in FIG. 1 or 2, the main body portion 100 is a type of housing installed between a vacuum pump (not shown) and a chamber (not shown), wherein an inlet 120 and an outlet 130 are disposed in a right angle shape, the inlet 120 and the outlet 130 are connected inside the main body portion 100, and an internal movement path 110 in the form of a space where the opening and closing blade 200, which will be described later, is located is formed.

Next, the opening and closing blade 200 will be described. As shown in FIG. 1 or 2, the opening and closing blade 200 is located within the internal movement path 110, and is coupled to the shaft portion 300 to be described later to open and close the outlet 130 according to a rotation direction of the handle portion 600 to be described later.

In this connection, a bellows 800 is further formed between an inner lower portion of the upper flange 500, which will be described later, and an upper portion of the opening and closing blade 200, to prevent the shaft portion 300 from being damaged and deformed by process by-products. In addition, it is preferable that an O-type ring is formed on a lower surface of the opening and closing blade 200 for tight sealing when the outlet 130 is closed.

Figure 4:
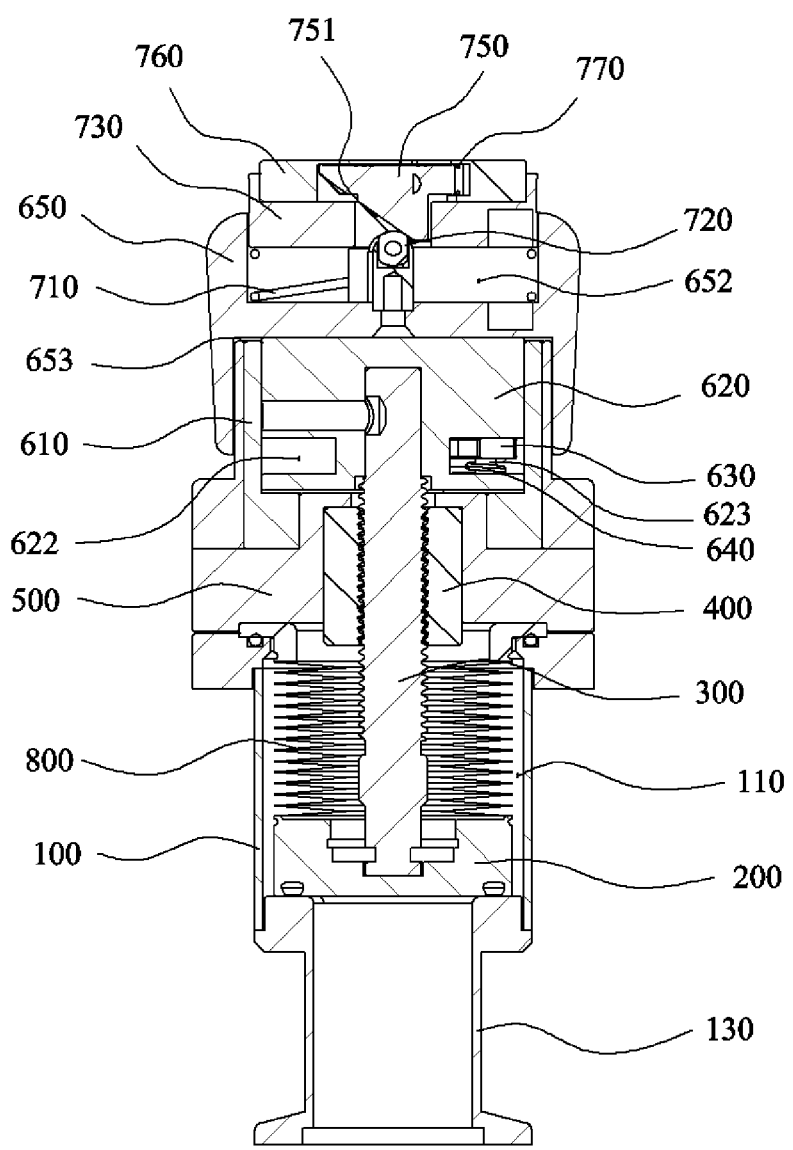
FIG. 4 is a cross-sectional view taken along line A-A' of FIG. 3.
Figure 5:
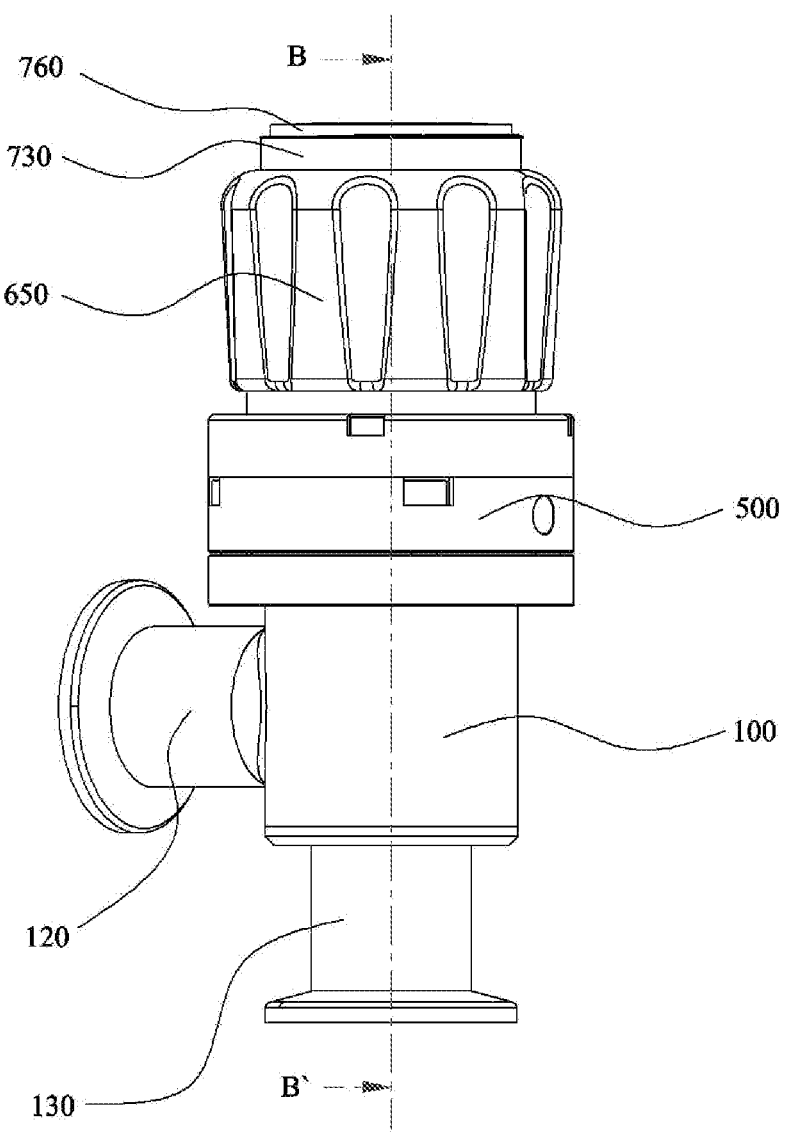
FIG. 5 is a side view of the side figure of an angle valve with a locking check function according to a preferred embodiment of the present disclosure.
Figure 6:
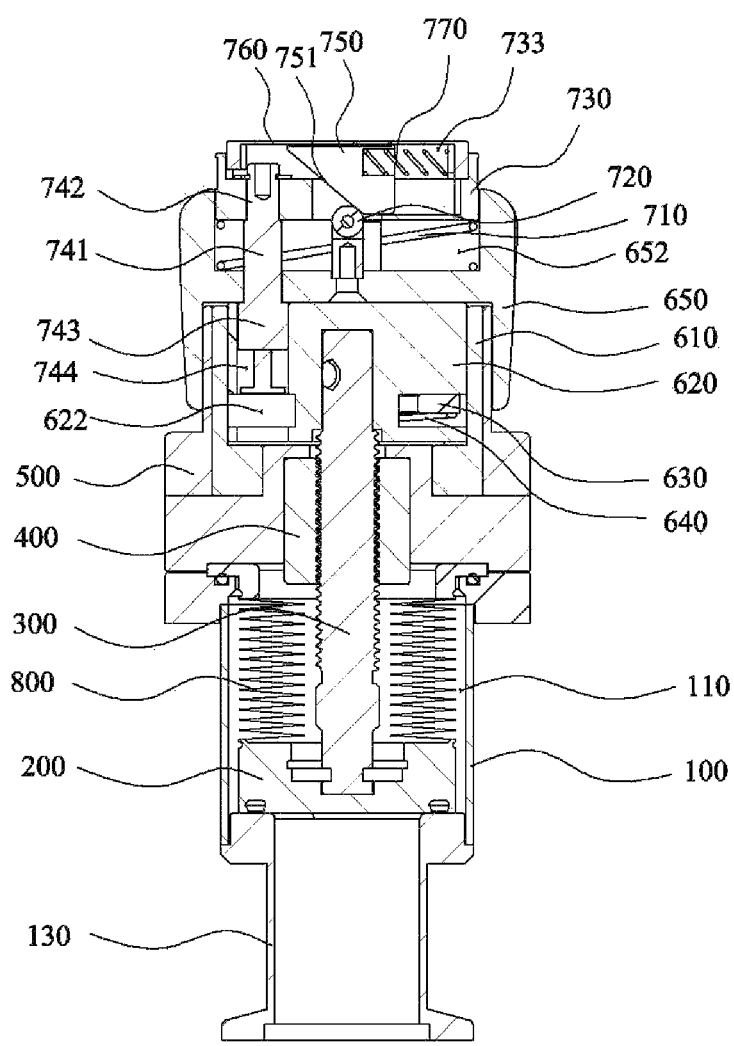
FIG. 6 is a cross-sectional view taken along line B-B' of FIG. 5
Figure 7:
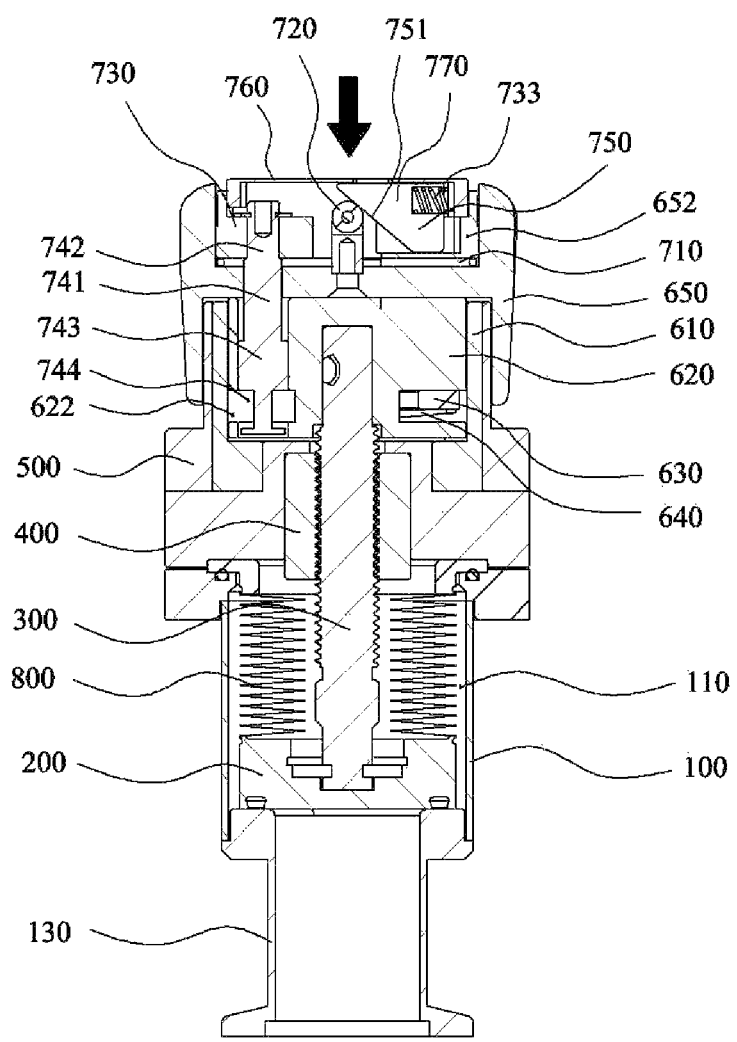
FIG. 7 is an embodiment diagram showing an angle valve with a locking check function according to a preferred embodiment of the present disclosure when a cover portion is pressed.
Figure 8:
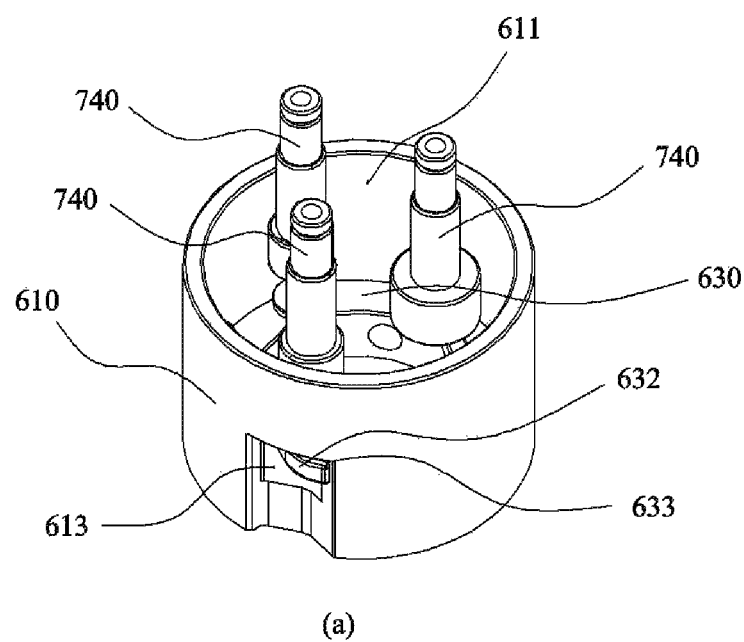
FIGS. 8 and 9 are embodiment diagrams showing each of the positions of a locking pin, a locking protrusion, and a lifting pin in the state of FIG. 7.
Figure 8:
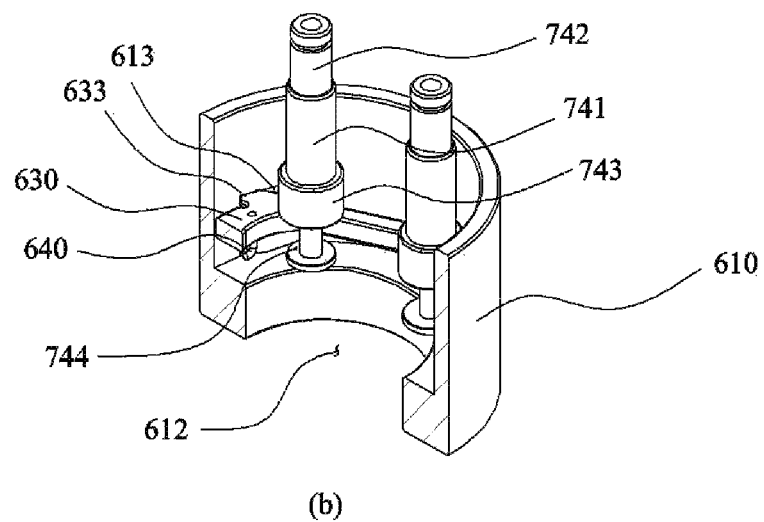

Next, the shaft portion 300 will be described. As shown in FIG. 2 or 4, the shaft portion 300 is a constituent that is connected to the opening and closing blade 200, the lifting guide block 400 to be described later, and a rotating body 620, and rotates in the same direction as the rotation direction of the handle portion 600 to guide the opening and closing blade to move in up and down directions. A screw thread is formed on an outer side surface of the shaft portion 300 and engages with a screw thread formed on an inner side surface of the lifting guide block 400, allowing the shaft portion 300 to be moved in up and down directions according to the rotation direction of the handle portion 600.

Next, the lifting guide block 400 will be described. As shown in FIG. 2 or 4, the lifting guide block 400 is a constituent that is fixed to an inner center side of the upper flange portion 500 and enables vertical movement of the shaft portion 300 by rotation of the handle portion 600. A screw tab is formed on an inner side surface of the lifting guide block 400 and engages with a screw thread formed on an outer side surface of the shaft portion 300, and guides the shaft portion 300 to be moved in up and down directions according to a rotation direction of the handle portion 600.

Figure 3:
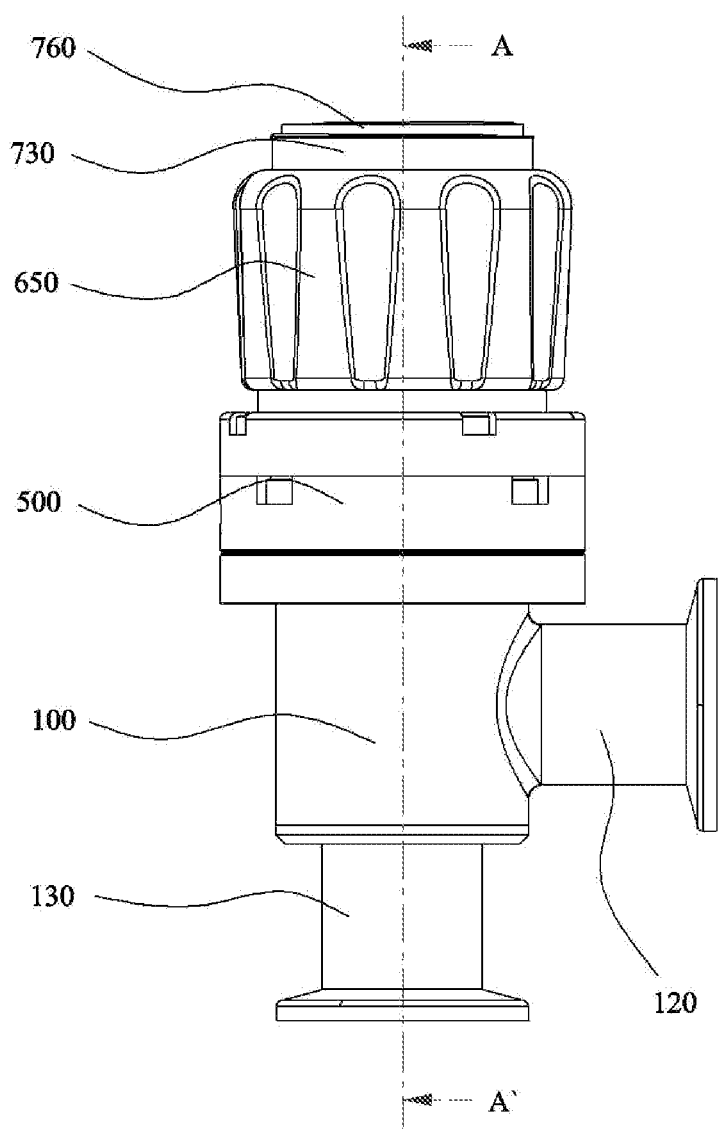
FIG. 3 is a front view of the front figure of an angle valve with a locking check function according to a preferred embodiment of the present disclosure.

Next, the upper flange portion 500 will be described. As shown in FIG. 1, FIG. 2 or FIG. 3, the upper flange portion 500 is a constituent that is coupled to an upper portion of the main body portion 100 and is assembled and disassembled. The lifting guide block 400 and bellows 800 are installed on the inside, and a first seating space 510 in which a locking pin fixture 610, which will be described later, is seated is formed on an upper inner side thereof.

In addition, a first through hole 520 is formed with a perforation in a lower portion of the first seating space 510 to allow the shaft portion 300 to pass through.

Next, the handle portion 600 will be described. As shown in FIG. 1, FIG. 2 or FIG. 3, the handle portion 600 is a constituent that is coupled to the shaft portion 300 and moves the shaft portion 300 in up and down directions according to the rotation direction to ascend or descend the opening and closing blade 200, and is configured of the locking pin fixture 610, the rotating body 620, a locking pin 630, a first spring 640, and a gripping portion 650.

The locking pin fixture 610 is a constituent that is seated and fixed in the first seating space 510 and limits the rotational movement of the locking pin 630, which will be described later, and rotates with the rotation of the gripping portion 650, which will be described later. A second seating space 611 is formed on an inner side thereof so that the rotating body 620, which will be described later, is seated.

In this connection, a second through hole 612 is formed with a perforation in a lower portion of the second seating space 611 so that the shaft portion 300 passes through and the shaft portion 300 is coupled to the rotating body 620.

A locking hole 613 is formed with a perforation on an outer peripheral surface of the locking pin fixture 610 so that when the gripping portion 650 rotates counterclockwise, the locking pin 630 rotates around a coupling protrusion 623 to be described later and a locking protrusion 632 formed on the locking pin 630 enters to limit the rotation of the locking pin 630.

In this connection, it is preferable that the tip of the locking hole 613 is formed in a stepped structure to prevent the locking pin 630 from rotating even when the gripping portion 650 continues to rotate counterclockwise, and the distal end of the locking hole 613 is formed as a curved surface so that the locking protrusion 632 may come out of the locking hole 613 when the gripping portion 650 rotates clockwise.

The rotating body 620 is a constituent that is seated in the second seating space 611 and rotates together with the gripping portion 650 and the shaft portion 300 to ascend or descend depending on a rotation direction. A coupling groove 621 is recessed in a lower portion of the entire body 620 to be coupled to the shaft portion 300.

A locking pin moving space 622 is recessed in an inner side direction around the lower outer peripheral surface of the rotating body 620 to enable the locking pin 630 to be inserted.

In addition, the coupling protrusion 623 is formed in a vertical direction in the locking pin moving space 622. Due to this, the locking pin 630 is connected to the coupling protrusion 623 and may be rotated about the central axis of the coupling protrusion 623.

A plurality of second lifting pin passing holes 624 are formed with a perforation in the rotating body 620 to allow a lifting pin 740, which will be described later, to pass through. In this connection, the second lifting pin passing hole 624 is preferably formed on the same central axis as a first lifting pin passing hole 654 and a third lifting pin passing hole 731, which will be described later.

The locking pin 630 is a constituent that releases contact with the locking hole 613 to enable rotation of the rotating body 620 and is connected to the lifting pin 740 to limit the upward movement of the lifting pin 740 when the rotating body 620 rotates clockwise and ascends while being rotatably connected to the coupling protrusion 623 and located within the locking pin moving space 622, and that contacts the locking hole 613 to limit the rotation of the rotating body 620 and disconnects from the lifting pin 740 to enable upward movement of the lifting pin 740 when the rotating body 620 rotates counterclockwise and descends. The locking pin 630 is preferably formed in a "C" shape to have a surface that may be in contact with the lifting pin 740 and a surface that is not in contact with the lifting pin 740 depending on the rotation direction of the gripping portion 650.

A hinge hole 631 is formed with a perforation in the locking pin 630 so as to be hinged with the coupling protrusion 623.

In addition, on an outside of the locking pin 630, the locking protrusion 632 is formed to protrude and is caught by the locking hole 613 according to the rotation direction of the rotating body 620 to limit the rotational movement of the rotating body 620. In this connection, the outer side surface of the locking protrusion 632 is formed as a curved surface, so that the locking protrusion 632 may easily pass over the distal end of the locking hole 613 in the process of rotating the rotating body 620 clockwise. A ring-shaped latch portion 633 is formed at the tip of the locking protrusion 632 for tight locking to the tip of the locking hole 613.

The first spring 640 is a type of torsion spring in which while being wound around the coupling protrusion 623, one side is in contact with the inner side surface of the second seating space 511, and the other side is coupled with the locking pin 630 to push the locking protrusion 532 outward through elastic force. When the rotating body 620 rotates counterclockwise and descends and the locking protrusion 632 is located in the locking hole 613, the locking pin 630 is rotated around the coupling protrusion 623 through elastic force so that the locking protrusion 632 moves in an outer direction of the locking hole 613.

It is preferable that the first spring 640 has a greater tension than a second spring 710, which will be described later.

The gripping portion 650 is a constituent in which a split plate 651 is formed inside, the third seating space 652 in which the opening and closing display guide portion 700 is seated is formed at an upper portion thereof, and a fourth seating space 653 surrounding the locking pin fixture 610 and the upper flange portion 500 is formed at a lower portion thereof. A plurality of first lifting pin passing holes 654 are formed with a perforation in the split plate 651 to allow the lifting pin 740 to pass through. In this connection, the first lifting pin passing hole 654 is also preferably formed located on the same central axis as the second lifting pin passing hole 624 and the third lifting pin passing hole 731.

Next, the opening and closing display guide portion 700 will be described. As shown in FIG. 1, FIG. 2 or FIG. 3, the opening and closing display guide portion 700 is a constituent in which when the opening and closing blade 200 closes the outlet 130 while being coupled to an upper side of the handle portion 600 and rotating the handle portion 600 counterclockwise, "CLOSE" is displayed, and in which when the handle portion 600 is rotated clockwise and the opening and closing blade 200 opens the outlet 130, "OPEN" is displayed. The opening and closing display guide portion 700 is configured of the second spring 710, a roller portion 720, a lifting plate portion 730, the lifting pin 740, a display portion 750, and a cover portion 760.

The second spring 710 is seated in the third seating space 652 and serves to provide elastic force to the lifting plate portion 730, which will be described later.

The roller unit 720 is formed on the center side of the third seating space 652 and guides the display portion 750, which will be described later, to move forward or backward depending on the ascending or descending position of the lifting plate portion 730.

The lifting plate portion 730 is a constituent located on the third seating space 652 and seated on the second spring 710. A third lifting pin passing hole 731 is formed with a perforation at a position corresponding to the second lifting pin passing hole 624, so that the upper portion of the lifting pin 740 is fixed, and a roller passing hole 732 is formed with a perforation on the center side of the lifting plate portion 730 to allow a roller portion 720 to pass through.

In addition, a spring seating groove 733 is formed horizontally recessed inside the lifting plate portion 730, and a third spring 770 is installed in the spring seating groove 733. In this connection, the third spring 770 serves to provide elastic force to the display portion 750.

In other words, when the outlet 130 is closed and the lifting plate portion 730 is pressed from the top while "CLOSE" is displayed on a check window 761, which will be described later, at the same time that the second spring 710 is compressed, the lifting pin 740 descends, and at the same time that the third spring 770 is also compressed, the display portion 750 moves diagonally along the roller portion 720 and changes from "CLOSE" display to "OPEN" display in the check window 761 to be described later.

The lifting pin 740 is a consistent shaped like a pin and whose tip is fixed in a state inserted into the third lifting pin passing hole 731, and that passes through the second lifting pin passing hole 624 and the first lifting pin passing hole 654 and ascends or descends depending on whether the lifting plate portion 730 is pressurized or the elastic restoring force of the second spring 710. The lifting pin 740 includes: a main body 741; a tip pin portion 742 formed on an upper portion of the main body 741 to be smaller than a diameter of the main body 741 and inserted into the third lifting pin passing hole 731; a distal end pin portion 743 formed on a lower portion of the main body 741 to be larger than a diameter of the main body 741 and inserted into the second lifting pin passing hole 624; and a locking pin insertion groove 744 recessed in an inner side direction around a lower outer side surface of the distal end pin portion 743.

In this connection, the diameter of the distal end pin portion 743 is formed to be larger than the diameter of the first lifting pin passing hole 654, so that the elastic force of the second spring 710 prevents the lifting plate portion 730 from being separated from the third seating space 652 to the outside.

It is preferable that three lifting pins 740 are provided on a plane and disposed in a triangular shape.

The display portion 750 is a constituent located inside an upper portion of the lifting plate portion 730 and provides a display of whether the outlet 130 is open or closed. An inclined portion 751 having "OPEN" and "CLOSE" displays formed at an upper portion thereof and formed at an angle in a lower portion thereof and in contact with the roller portion 720 is formed.

The cover portion 760 is located on an upper side of the lifting plate portion 730, and a check window 761 is formed with a perforation so that the display of "OPEN" or "CLOSE" of the display portion 750 appears at an upper portion of the cover portion 760.

Hereinafter, with reference to FIGS. 6 to 13, a process in which an angle valve with a locking check function according to a preferred embodiment of the present disclosure is converted from a closed state to an open state will be described.

First, when the opening and closing blade 200 closes the outlet 130, the locking protrusion 632 is caught in the locking hole 613, the locking pin 630 is separated from the locking pin insertion groove 744, a portion of the upper portion of the cover portion 760 is exposed to the outside, and the display of "CLOSE" is exposed in the check window 761.

In this connection, the second and third springs 710 and 770 are in a tensioned state.

Thereafter, when the cover portion 760 is pressed while the display of "CLOSE" is exposed on the check window 761, the display portion 750 descends in a diagonal direction and a display of "OPEN" is exposed on the check window 761. Simultaneously, the lifting pin 740 descends so that the locking pin insertion groove 744 is located in the locking pin moving space 622.

In this connection, the second and third springs 710 and 770 are in a compressed state.

Next, when the gripping portion 650 is rotated clockwise while the cover portion 760 is pressed, the rotating body 620 rotates clockwise and ascends at the same time, causing the locking protrusion 632 to be separated from the locking hole 613. As a result, the locking pin 630 is inserted into the locking pin insertion groove 744 to limit the vertical movement of the locking pin 630, so that the outlet 130 is opened while the cover portion 760 is maintained in a pressed state without being ascended by the elastic force of the second spring 710.

When the gripping portion 650 is rotated counterclockwise to close the outlet 130, the rotating body 620 rotates counterclockwise and simultaneously descends. The locking pin 630 rotates due to the elastic force of the first spring 640 so that the locking protrusion 632 is caught in the locking hole 613. As a result, the locking pin 630 is separated from the locking pin insertion groove 744. As the vertical movement limitation of the lifting pin 740 is released, the lifting plate portion 730 ascends due to the elastic force of the second spring 710. Simultaneously, as the display portion 750 moves in a diagonal direction along the roller portion 720 due to the elastic force of the third spring 770, a display of "CLOSE" is exposed on the check window 761.

Optimal embodiments are disclosed in the drawings and specifications. Although specific terms are used herein, they are used only for the purpose of explaining the present disclosure and are not used to limit the meaning or scope of the present disclosure described in the claims. Accordingly, those skilled in the art will understand that various modifications and other equivalent embodiments are possible therefrom. Accordingly, the true technical protection scope of the present disclosure should be determined by the technical spirit of the attached claims.

DESCRIPTION OF REFERENCE NUMERALS

1: Angle valve with a locking check function
100: Main body portion
110: Internal movement path
120: Inlet
130: Outlet
200: Opening and closing blade
300: Shaft portion
400: Lifting guide block
500: Upper flange portion
510: First seating space
520: First through hole
600: Handle portion
610: Locking pin fixture
611: Second seating space
612: Second through hole
613: Locking hole
620: Rotating body
621: Coupling groove
622: Locking pin moving space
623: Coupling protrusion
624: Second lifting pin passing hole
630: Locking pin
631: Hinge hole
632: Locking protrusion
633: Latch portion
640: First spring
650: Gripping portion
651: Split plate
652: Third seating space
653: Fourth seating space
654: First lifting pin passing hole
700: Opening and closing display guide portion
710: Second spring
720: Roller portion
730: Lifting plate portion
731: Third lifting pin passing hole
732: Roller passing hole
733: Spring seating groove
740: Lifting pin
741: Main body
742: Tip pin portion
743: Distal end pin portion
744: Locking pin insertion groove
750: Display portion
751: Inclined portion
760: Cover portion
761: Check window
770: Third spring
800: Bellows

What is claimed is:

1. An angle valve with a locking check function, comprising:
    a main body portion in which an internal movement path, an inlet, and an outlet are formed;
    an opening and closing blade provided on the internal movement path to open and close the outlet;
    a shaft portion coupled to an upper portion of the opening and closing blade and having a thread formed on an outer side surface;
    an upper flange portion that is coupled to an upper portion of the main body portion, has a first seating space formed on an inner side, and has a first through hole formed as a perforation in a lower portion of the first seating space and through which the shaft portion passes;
    a lifting guide block fixed to an interior of the upper flange portion;
    a handle portion surrounding the upper flange portion and coupled to the shaft portion to move the shaft portion in up and down directions according to a rotation direction of the handle portion and to ascend or descend the opening and closing blade; and
    an opening and closing display guide portion that is coupled to an upper side of the handle portion and, when the handle portion rotates counterclockwise such that the opening and closing blade closes the outlet, the opening and closing display guide portion ascends to display "CLOSE,"
    wherein the handle portion comprises:
    a locking pin fixture that is seated in the first seating space, has a second seating space formed on an inner side, has a second through hole formed as a perforation in a lower portion of the second seating space and through which the shaft portion passes, and has a locking hole formed as a perforation on an outer peripheral surface;
    a rotating body that is seated in the second seating space, a coupling groove recessed in a lower portion of the rotating body and coupled to the shaft portion, a locking pin moving space is recessed in an inner direction around an outer peripheral surface of a lower side of the rotating body, and a coupling protrusion is formed in a vertical direction in the locking pin moving space;

a locking pin that is located within the locking pin moving space and is formed in a "C"-shape in which a hinge hole is formed as a perforation and is coupled to the coupling protrusion to form a hinge, and a locking protrusion is formed to protrude and be caught by the locking hole according to a rotation direction of the rotating body on an outer side and limit a rotational movement of the rotating body;

a first spring wound around the coupling protrusion, one side of the first spring is in contact with an inner surface of the second seating space, and the other side of the first spring is coupled to the locking pin and pushes the locking protrusion outward through elastic force; and a gripping portion with a split plate formed inside to form a third seating space where the opening and closing display guide portion is seated in an upper portion of the gripping portion and to form a fourth seating space surrounding the locking pin fixture and the upper flange portion in a lower portion of the gripping portion.

2. The angle valve of claim 1, wherein a plurality of first lifting pin passing holes are formed as perforations in the split plate, and a second lifting pin passing hole is formed as a perforation in the rotating body at a position corresponding to the first lifting pin passing hole in the rotating body.

3. The angle valve of claim 2, wherein the opening and closing display guide portion comprises:

a second spring provided in the third seating space;

a roller portion formed on a center of the third seating space;

a lifting plate portion seated on the second spring and having a third lifting pin passing hole formed as a perforation at a position corresponding to the second lifting pin passing hole, and a roller passing hole formed as a perforation on a center of the lifting plate portion and through which the roller portion passes;

a lifting pin fixed in a state where a tip is inserted into the third lifting pin passing hole and remaining portions of the lifting pin are inserted through the second lifting pin passing hole and the first lifting pin passing hole;

a display portion having an inclined portion formed at an angle in a lower portion thereof and in contact with the roller portion and having "OPEN" and "CLOSE" displays formed at an upper portion thereof;

a cover portion formed with a check window on which the "OPEN" and "CLOSE" displays appear at an upper portion thereof; and a third spring located between one side of the display portion and an inner side surface of the cover portion to provide elastic force to the display portion.

4. The angle valve of claim 3, wherein the lifting pin comprises:

a main body;

the tip of the lifting pin extending from an upper portion of the main body to be smaller than a diameter of the main body and inserted into the third lifting pin passing hole;

a distal end pin portion extending from a lower portion of the main body to be larger than a diameter of the main body and inserted into the second lifting pin passing hole; and a locking pin insertion groove recessed in an inner side direction around a lower outer side surface of the distal end pin portion.

\* \* \* \* \*